(12) United States Patent
Strack

(10) Patent No.: US 8,186,536 B2
(45) Date of Patent: May 29, 2012

(54) MOLDING PROCESS OF LINER WITH DIVIDED BOSS ADAPTER

(75) Inventor: Ludger Strack, Heidenrod (DE)

(73) Assignee: GM Global Technology Operations LLC, Detroit, MI (US)

( * ) Notice: Subject to any disclaimer, the term of this patent is extended or adjusted under 35 U.S.C. 154(b) by 213 days.

(21) Appl. No.: 12/612,382

(22) Filed: Nov. 4, 2009

(65) Prior Publication Data

US 2011/0101002 A1    May 5, 2011

(51) Int. Cl.
*F17C 1/02* (2006.01)
(52) U.S. Cl. ........................................ 220/586
(58) Field of Classification Search ................. 220/581, 220/582, 586–590
See application file for complete search history.

(56) References Cited

U.S. PATENT DOCUMENTS

| | | | |
|---|---|---|---|
| 5,819,978 A * | 10/1998 | Hlebovy | 220/601 |
| 6,186,356 B1 * | 2/2001 | Berkley et al. | 220/582 |
| 7,857,159 B2 * | 12/2010 | Lindner | 220/586 |
| 7,959,027 B2 * | 6/2011 | Weber | 220/588 |
| 2008/0251520 A1 * | 10/2008 | Ota et al. | 220/586 |

FOREIGN PATENT DOCUMENTS

| | | |
|---|---|---|
| DE | 19526154 A1 | 1/1997 |
| EP | 1248929 A2 | 10/2002 |
| WO | WO 99/13263 | 3/1999 |
| WO | WO 99/39896 | 8/1999 |
| WO | WO 2007/079971 A1 | 7/2007 |

\* cited by examiner

*Primary Examiner* — Harry Grosso
(74) *Attorney, Agent, or Firm* — Fraser Clemens Martin & Miller LLC; J. Douglas Miller

(57) ABSTRACT

A boss for use with a vessel is disclosed. The boss includes a first component adapted to be formed in an opening of the vessel, wherein the first component includes a first coupling element, and a second component including a second coupling element, wherein the second coupling element engages the first coupling element to secure the second component to the first component, and wherein a liner of the vessel is disposed therebetween.

20 Claims, 4 Drawing Sheets

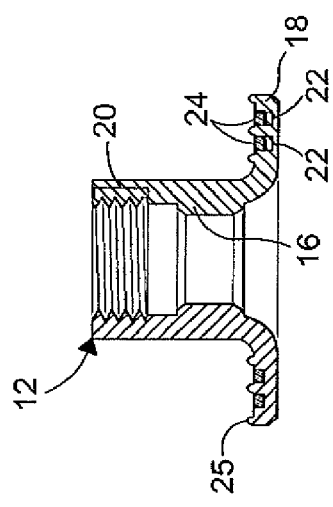
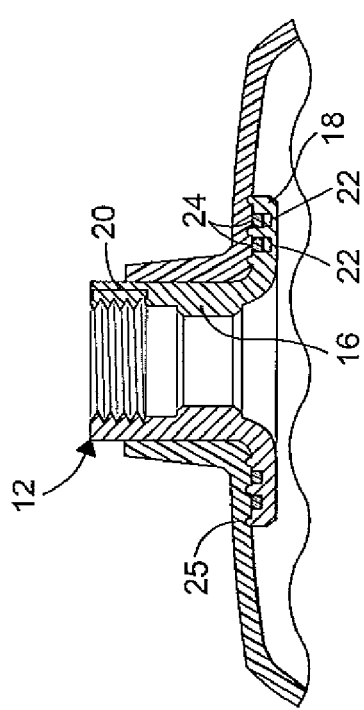
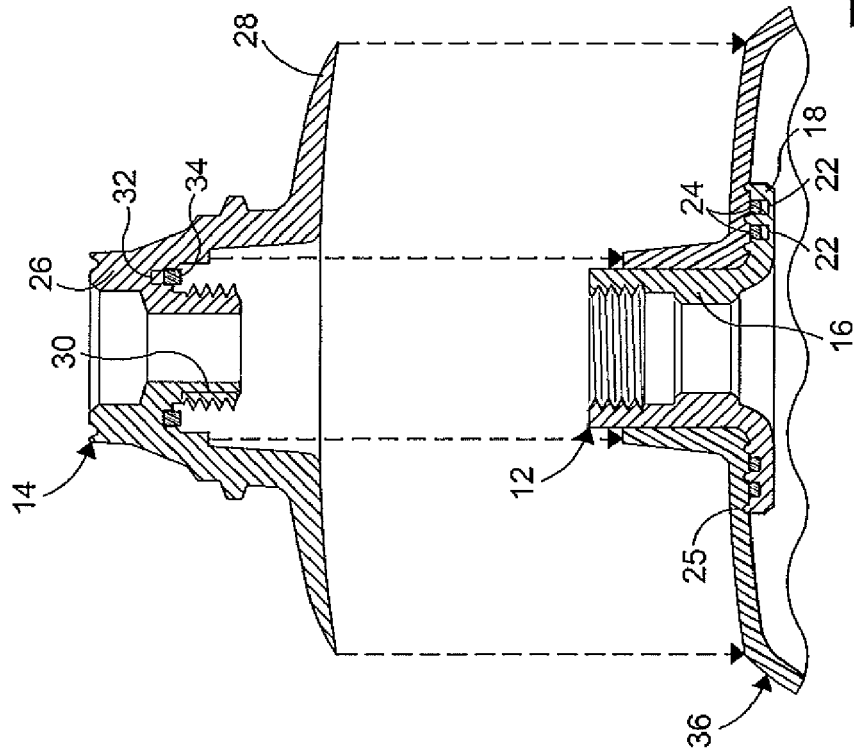

MOLDING PROCESS OF LINER WITH DIVIDED BOSS ADAPTER

FIELD OF THE INVENTION

The invention relates to pressure vessels. More particularly, the invention is directed to a divided boss adapter and a method for molding an inner liner of a pressure vessel including the divided boss adapter.

BACKGROUND OF THE INVENTION

A pressure vessel for storing a fluid medium (such as hydrogen) typically includes a pressure chamber which contains the pressurized fluid medium that is moved in a controlled manner in or out of the vessel. In certain designs, the pressure vessel includes an inner plastic liner with two metal mouthpieces (bosses) arranged on opposite ends, and a filament wound outer shell to support the inner vessel liner.

Typically, the vessel liner is manufactured using a conventional injection molding, blow molding, rotational molding process, or thermoforming process. For example, the following patents describe a vessel liner (WO 1999/039896 Dulisse, JMK; WO 2007/079971 Müller, Xperion; DE 19526154 Lange, Mannesmann etc.; and WO 1999/013263 Jensen, Raufoss), each of which is incorporated herein by reference in its entirety.

To permit controlled movement of fluids in or out of the pressure chamber, the vessel is typically configured with a pressure chamber orifice and a boss is fitted in the orifice. The boss is threaded or otherwise shaped for connection to nozzles, valves, gauges, tubes, and similar fixtures which direct and control fluid flow. Accordingly, the boss is formed of a metal or another conventional material having desired properties.

The boss typically includes a cylindrical neck with a longitudinal passage that provides fluid communication between the pressure chamber and the environment outside the vessel. A longitudinal axis is defined within the neck as substantially parallel to a direction the passage between open ends thereof. In certain designs, a flange is secured to one end of the neck. The flange, which is larger than the pressure chamber orifice, is secured to the liner of the pressure vessel to militate against relative movement between the boss and the liner.

First, it is desirable to militate against a translation of the boss, in respect of the liner. That is, the boss should not be permitted to move along the central longitudinal axis of the neck such that it falls completely inside the pressure chamber. Nor should the boss be allowed to move in the opposite direction and separate itself from the vessel.

Second, it is desirable to militate against a rotation of the boss, in respect of the liner. That is, the boss should not be permitted to rotate with respect to the liner about the central axis of the neck or about the pressure chamber orifice. Thus, when the vessel is held and an attempt is made to thread a fixture into the threaded boss, the boss should not thwart the attempt by rotating with respect to the liner.

The problem therefore arises of how to securely attach the boss to a non-metallic liner to prevent translation and rotation of the boss while providing a substantially fluid-tight seal between the boss and the vessel liner. One approach simply relies on the internal pressure in the vessel to attach the boss and liner. Although this pressure may suffice to create a seal between the boss and the non-metallic liner in some vessels, and may also prevent boss translation, it generally does not prevent boss rotation.

Another approach positions the boss between two lips of a partially bifurcated liner. Such a liner includes two lip layers disposed about the circumference of the pressure chamber orifice. The boss flange is positioned in an annular recess between the lip layers and is encapsulated by the liner lips. No adhesive is used between the boss and the liner lips. Although this approach limits boss translation, it fails to substantially restrict boss rotation.

A different approach to securing the boss to the liner includes placing a layer of adhesive between the boss and the liner. The adhesive bonds the boss and the liner together, at least initially. Unfortunately, some adhesives deteriorate over time. Thus, the adhesive may not last the entire service life of the vessel, particularly if pressure and thermal stresses or chemical contaminants are introduced into the vessel.

It is also difficult to bond metal bosses to certain thermoplastic materials such as nylons and polyolefins, because petroleum-based thermoplastic materials inherently have a so-called "lubricated" surface. The use of adhesives to bond metal to such materials typically involves elaborate surface preparation and treatment steps to ensure an adequate bond. The repeatability of adequate bonding also becomes operator sensitive, and hence, problematic in large volume manufacturing.

It would be desirable to develop a boss for use with a pressure vessel and a method for forming an inner liner of the pressure vessel including the boss, wherein the boss is securely coupled to the liner to form a substantially fluid-tight seal between the boss and the vessel liner.

SUMMARY OF THE INVENTION

Concordant and consistent with the present invention, a boss for use with a pressure vessel and a method for forming an inner liner of the pressure vessel including the boss, wherein the boss is securely coupled to the liner to form a substantially fluid-tight seal between the boss and the vessel liner, has surprisingly been discovered.

In one embodiment, a boss comprises: a first component adapted to be formed in an opening of the vessel, wherein the first component includes a first coupling element; and a second component including a second coupling element, wherein the second coupling element engages the first coupling element to secure the second component to the first component, and wherein a liner of the vessel is disposed therebetween.

In another embodiment, a pressure vessel for storing a fluid comprises: a first component adapted to be formed in an opening of the vessel, the first component having a shoulder portion and a neck portion, wherein the neck portion includes a first coupling element; a liner disposed around the neck portion of the first component; and a second component having a shoulder portion and a neck portion, the neck portion including a second coupling element, wherein the second coupling element engages the first coupling element to secure the second component with the first component, and wherein the liner of the vessel is disposed therebetween.

The invention also provides methods for blow molding an inner liner of a pressure vessel including a divided boss.

One method comprises the steps of: providing a first component of the boss adapted to be formed in an opening of the vessel, the first component having a shoulder portion and a neck portion, wherein the neck portion includes a first coupling element; securing a parison around the neck portion of the first component; molding the parison into a pre-determined formation, thereby forming a hollowed liner of the vessel; coupling a second component of the boss to the first component, wherein the second component includes a second coupling element for engaging the first coupling element to secure the second component to the first component, and wherein the liner of the vessel is disposed therebetween.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which:

FIG. 3a is a cross-sectional view of a first component of the divided boss of FIG. 1;

FIG. 3b is a fragmentary cross-sectional view of the first component of the divided boss of FIG. 1, wherein the first component is shown assembled with a vessel liner;

FIG. 3c. is a partially exploded fragmentary cross-sectional view of the divided boss of FIG. 1, showing the first component assembled with the vessel liner and a second component exploded from the first component.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
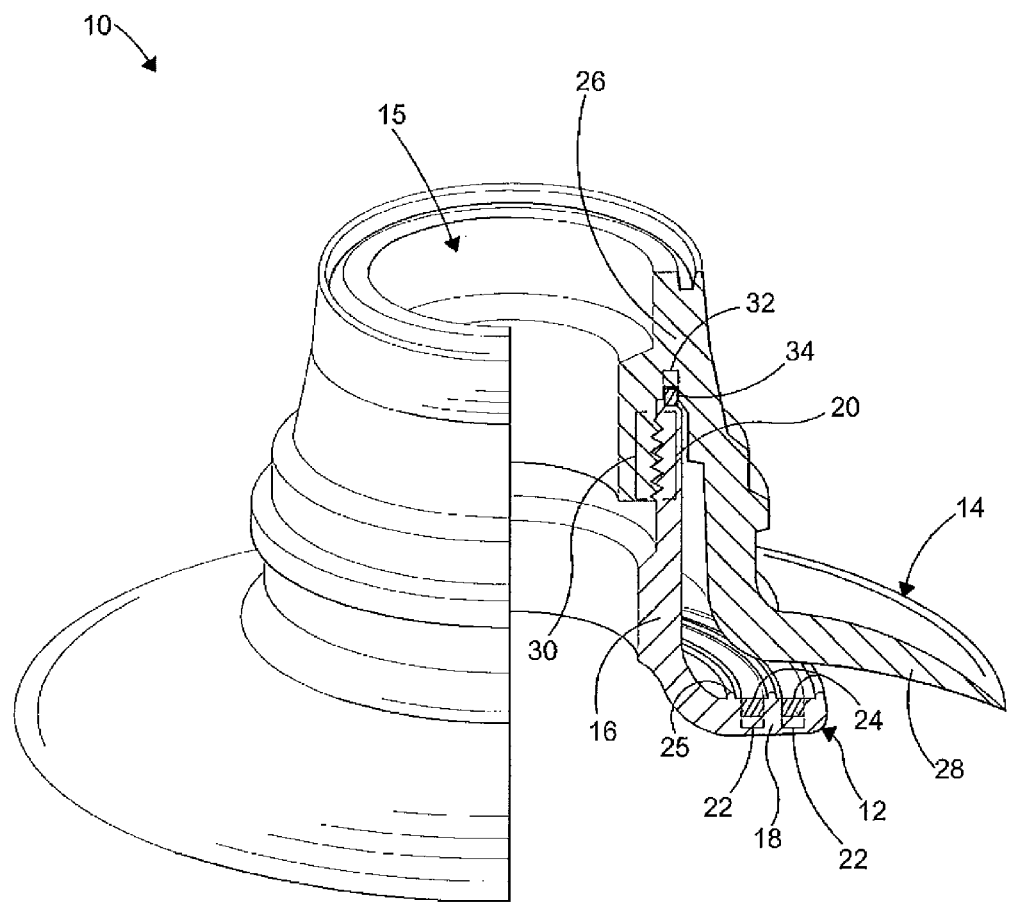
FIG. 1 is a perspective view of a divided boss according to an embodiment of the present invention, a portion of the divided boss shown in section.

FIG. 1 illustrates a divided boss 10 according to an embodiment of the present invention. The boss 10 includes a first component 12, referred to as an insert component, and a second component 14, referred to as a sealing component. The boss 10 may be integrated with a pressure vessel to provide a means for connecting various fixtures and utility devices to the vessel. The first component 12 and the second component 14 cooperate to define a passage 15 to provide a fluid communication between a pressure chamber formed in the vessel and an environment outside the vessel. Additionally, the boss 10 reinforces the vessel around an orifice formed in the vessel. It is understood that the passage 15 may have any size, diameter, and shape.

The first component 12 of the boss 10 is typically formed from a metal. However, other materials such as plastic, hard rubber, and resin may be used. As shown, the first component 12 includes a neck portion 16 and a shoulder portion 18. The neck portion 16 includes a coupling element 20 for engaging and securing the first component 12 with the second component 14 of the boss 10. As a non-limiting example, the coupling element 20 includes a substantially helical thread or groove formed on an inside surface of the neck portion 16 of the first component 12. However, other means for engaging and securing the first component 12 and the second component 14 may be used. The shoulder portion 18 of the first component 12 includes a plurality of annular channels 22 formed therein, wherein each of the annular channels 22 is adapted to receive a first sealing element 24. As shown, the first component 12 includes two channels 22, each of the channels including one first sealing element 24. However, any number of channels 22 and first sealing elements 24 may be used. As a non-limiting example, the first sealing element 22 is an O-ring formed from at least one of an elastomer and a plastic. However, other materials having desired characteristics may be used such as a rubber, a metal, and an ultra high molecular weight polyethylene (UHMW-PE), for example. As a further example, an encapsulated O-ring may be used, wherein the encapsulated O-ring includes multiple layers formed from various materials such as fluorinated ethylene propylene, fluoroelastomers (FKM), and methyl-vinyl silicone rubber (VMQ), for example. The shoulder portion 18 of the first component 12 further includes a plurality of protrusions 25 or ribs formed therein. As a non-limiting example, the protrusions 25 may be separately formed and coupled to the first component 12. In the embodiment shown, the protrusions 25 are annular rings formed on the first component 12. However, it is understood that the protrusions 25 may have any shape and size. It is further understood that any number of the protrusions 25 or no protrusions may be used.

The second component 14 of the boss 10 is typically formed from a metal. However, other materials such as plastic, hard rubber, and resin may be used. The second component 14 includes a neck portion 26 and a shoulder portion 28. As shown, the neck portion 26 has a substantially inverted "J" shape to facilitate formation of a substantially fluid-tight seal between the first component 12 and the second component 14. However, the neck portion 26 may have any shape and size. It is understood that the neck portion 26 of the second component 14 is formed to receive various fixtures and utility devices such as pressure regulators, nozzles, valves, gauges, tubes, and similar fixtures which direct and control fluid flow in and out of the vessel. It is further understood that the second component 14 may include additional coupling features for receiving and securing utility devices to the boss 10.

The neck portion 26 of the second component 14 includes a coupling element 30 for engaging the coupling element 20 of the first component 12 to secure the first component 12 with the second component 14. As a non-limiting, the coupling element 30 includes a substantially helical thread or groove formed on an inside surface of the neck portion 26 of the second component 14. However, other means for engaging and securing the first component 12 and the second component 14 may be used. The neck portion 26 of the second component 14 further includes an annular channel 32 for receiving a second sealing element 34. As shown, the second component 14 includes one channel 32 having one second sealing element 34 disposed therein. However, the second component 14 may include any number of channels 32 and second sealing elements 34. As a non-limiting example the second sealing element 34 is an O-ring formed from at least one of an elastomer and a plastic. However, other materials having desired characteristics may be used such as a rubber and an ultra high molecular weight polyethylene (UHMW-PE), for example.

Figure 2A:
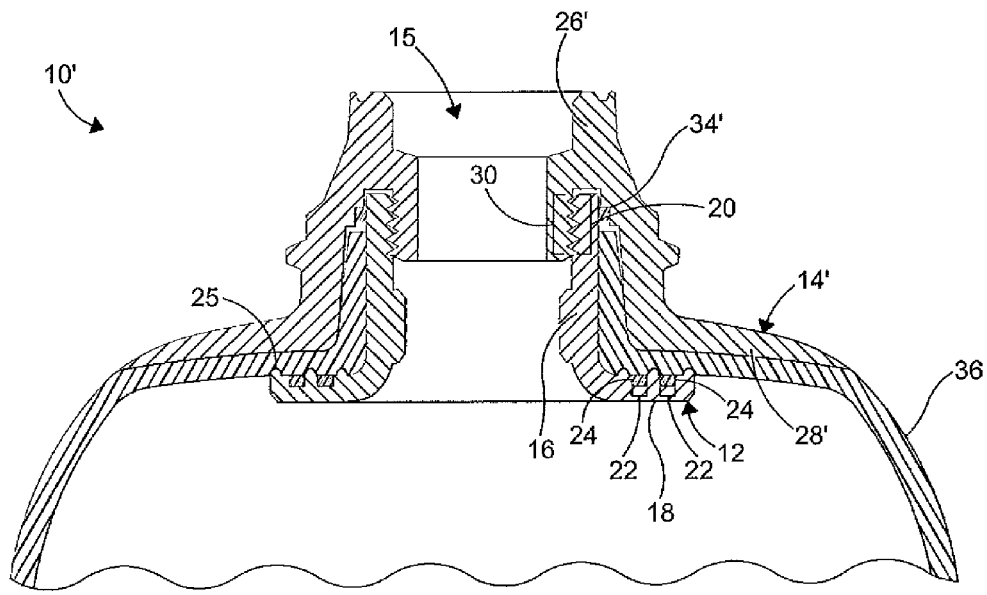
FIG. 2a is a fragmentary cross-sectional view of a divided boss and a liner according to another embodiment of the present invention.

FIG. 2a shows a divided boss 10' according to another embodiment of the present invention similar to the divided boss 10 of FIG. 1, except as described below. Structure repeated from the description of FIG. 1 includes the same reference numeral. Variations of structure shown in FIG. 1 include the same reference numeral and a prime (') symbol. As shown in FIG. 2a, the second component 14' is coupled to the first component 12 securing a vessel liner 36 therebetween. As a non-limiting example, the vessel liner 36 is formed from a thermoplastic material. However, other plastics and non-metallic materials may be used. Additionally, a second sealing element 34' is disposed adjacent the vessel liner 36 and between the neck portion 26' of the second component 14' and a neck portion 16 of the first component 12. The second sealing element 34' may be secured to the second component 14' using any conventional means such as pressure fitting, for example. As a non-limiting example the second sealing element 34' is an O-ring formed from at least one of an elastomer and a plastic. However, other materials having pre-determined characteristics may be used such as a rubber and an ultra high molecular weight polyethylene (UHMW-PE), for example.

Figure 2B:
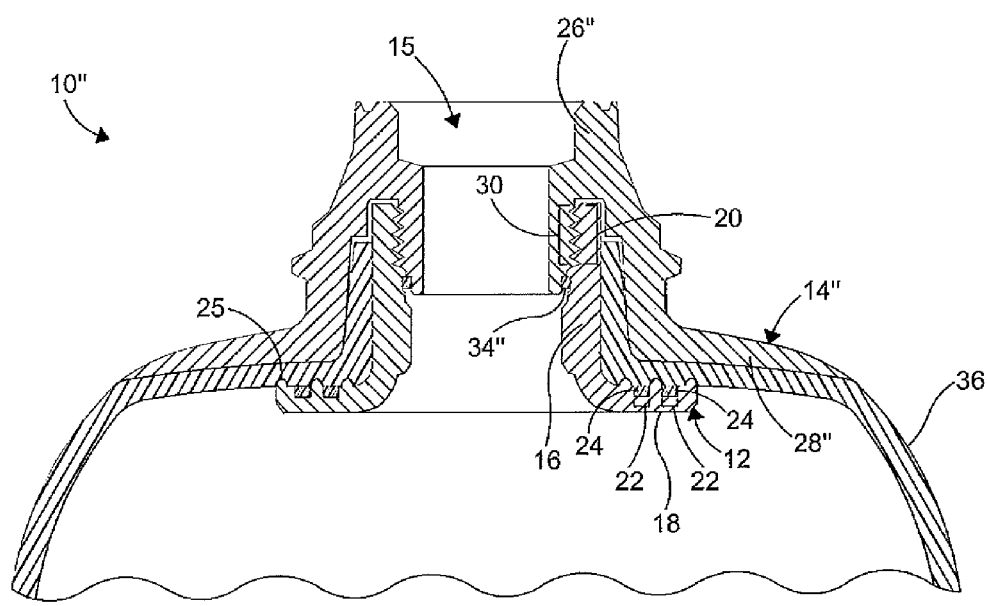
FIG. 2b is a fragmentary cross-sectional view of a divided boss and a liner according to yet another embodiment of the present invention.

FIG. 2b shows a divided boss 10" according to another embodiment of the present invention similar to the divided boss 10 of FIG. 1, except as described below. Structure repeated from the description of FIG. 1 includes the same reference numeral. Variations of structure shown in FIG. 1 include the same reference numeral and a double prime (") symbol. As shown in FIG. 2b, the second component 14" is coupled to the first component 12 securing a vessel liner 36 therebetween. As a non-limiting example, the vessel liner 36 is formed from a thermoplastic material. However, other plastics and suitable material may be used. Additionally, a second sealing element 34" is disposed between the neck portion 26" of the second component 14" and the neck portion 16 of the first component 12. Specifically, the second sealing element 34" is disposed on an interior surface of the neck portion 16 of the first component 12, wherein the second sealing element 34" is adjacent the coupling element 20 of the first component 12. The second sealing element 34" may be secured to the second component 14" using any conventional means such as pressure fitting, for example. As a non-limiting example the second sealing element 34" is an O-ring formed from at least one of an elastomer and a plastic. However, other materials having pre-determined characteristics may be used such as a rubber and an ultra high molecular weight polyethylene (UHMW-PE), for example.

FIGS. 3a, 3b, and 3c illustrate a method for forming the vessel liner 36 including the integrated, divided boss 10. As more clearly shown in FIG. 3a, the first sealing elements 22 are disposed in the channels 20 formed in the first component 12 of the divided boss 10. It is understood that any number of the first components 12, the channels 22, and the first sealing elements 24 may be used.

In certain embodiments, the first component 12 is coupled to a blow pin (not shown), known in the art of blow molding. Additionally, a parison (not shown) of the vessel liner 36 is guided around the shoulder portion 18 of the first component 12. As such, a blow tool, known in the art, closes around the parison and "pinches" or secures the parison around a circumference of the neck portion 16 and the shoulder portion 18 of the first component 12, illustrated in FIG. 3b. Where the shoulder portion 18 of the first component 12 includes the protrusions 25, the protrusions 25 engage the vessel liner 36 to minimize radial elongation and movement of the vessel liner 36. Thereafter, the blow pin introduces air into the parison, thereby expanding the parison into the hollowed vessel liner 36. It is understood that other gases or fluids may be used to form the hollowed vessel liner 36. After the liner 36 has a desired form, the blow tool releases the formed liner 36 and any scrap material of the parison is removed by a cutting process known to one skilled in the art of blow molding.

As more clearly shown in FIG. 3c, the associated second component 14 engages the first component 12 to secure the liner 36 therebetween. Additionally, the second sealing element 34 is disposed between the second component 14 and the first component 12. It is understood that the second sealing elements 34 may be disposed in the channel 32 formed in the second component 14. It is further understood that any number of the second components 14, the channels 32, and the second sealing elements 34 may be used.

In certain embodiments, the second component 14 is secured to the first component 12 by "screwing" the components 12, 14 together. Specifically, the engaging element 30 of the second component 14 is aligned to be threaded together with the engaging element 20 of the first component 12. As the second component 14 is rotationally screwed to the first component 12, the shoulder portion 28 of the second component 14 moves closer to the shoulder portion 18 of the first component 12 and the liner 36 is sealed between the neck portions 16, 26 and shoulder portions 18, 28 of the components 12, 14 of the boss 10. In certain embodiments, a fastener device engages the first component 12 to minimize a rotational motion of the first component 12 while the second component 14 is "screwed" to the first component 12.

Figure 4:
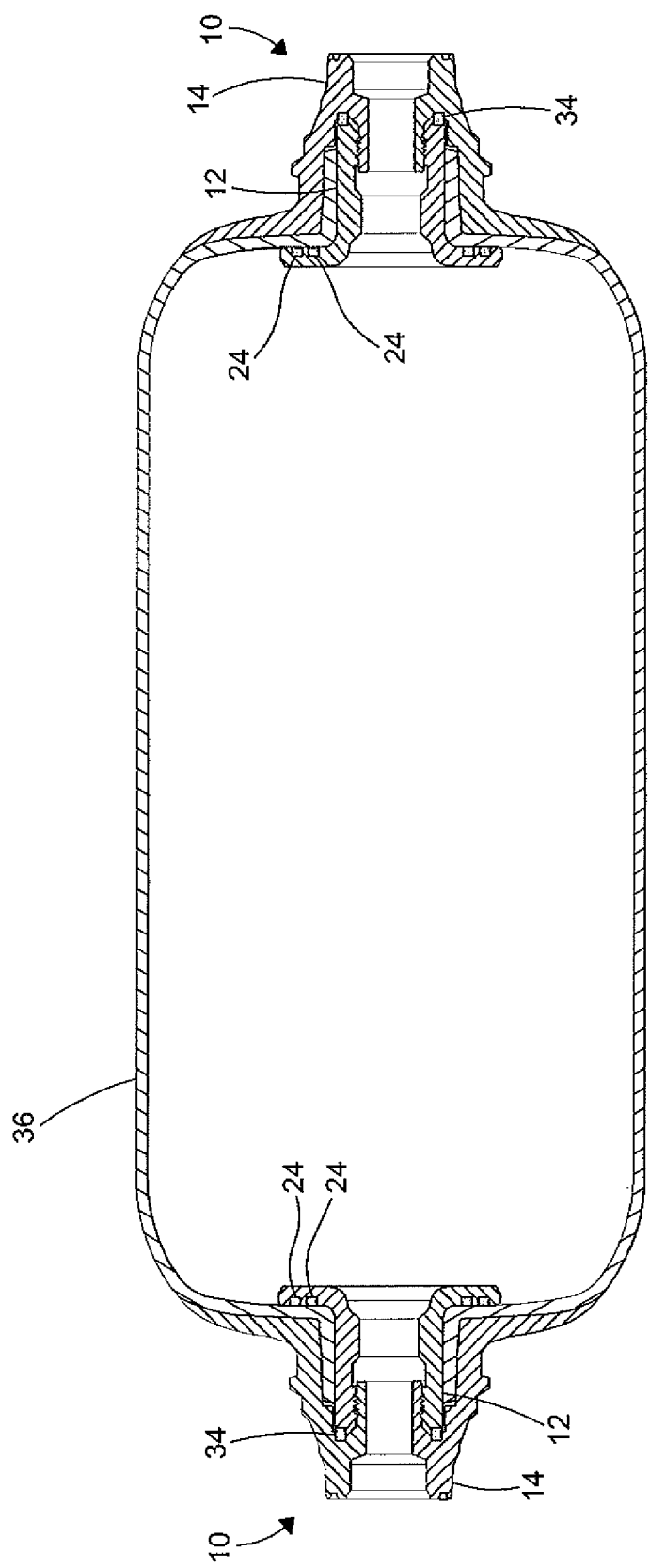
FIG. 4 is a side-elevational cross-sectional view of a vessel liner including two of the divided bosses of the embodiment of FIG. 1.

FIG. 4 shows the formed liner 36 including a plurality of the divided bosses 10 secured to opposite ends thereof. In certain embodiments, the divided bosses 10 have similar inner diameters. However, it is understood that the divided bosses 10 may have any size and diameter such as a size and diameter suitable for coupling with a valve component or a thermal-pressure relief device (TPRD). The first component 12 and the second component 14 of the bosses 10 cooperate to form a substantially fluid-tight seal at opposite ends of the liner 36. Additionally, the integrated bosses 10 provide a means for attaching various devices and utility elements to the formed vessel liner 36. It is understood that additional coatings and layers such as composites and fibers may be applied to the vessel liner 36 to form the final pressure vessel. As a non-limiting example, the addition layers formed around the vessel liner 36 may be formed by at least one of a winding process, a rotational molding process, and a curing process known in the art. It is further understood that the vessel liner 36 and resultant pressure vessel may have any shape and size determined by the forming process.

Accordingly, the divided boss 10, 10', 10" and the method for forming the inner liner 36 of the pressure vessel including the divided boss 10, 10', 10" provide a durable, substantially fluid-tight connection between the liner 36 and the boss 10, 10', 10", while providing a variability in material selection and molding dimensions. Additionally, the formed liner 36 including the boss 10, 10', 10" maintains the benefits of the present invention without having a welded seam common to conventional designs.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:
1. A boss for use with a vessel, the boss comprising:
 a first component including a neck portion and a shoulder portion, the first component adapted to be formed in an opening of the vessel, wherein the first component includes a first coupling element; and
 a second component including a neck portion and a shoulder portion, the neck portion including a second coupling element, wherein the second coupling element is adapted to engage the first coupling element to secure the second component to the first component, wherein a space exists for receiving a liner of the vessel when the first coupling element is engaged with the second coupling element, the space located between a part of the neck portion of the first component and a part of the neck portion of the second component and between a part of the shoulder portion of the first component and a part of the shoulder portion of the second component.

2. The boss according to claim 1, wherein the first component includes at least one of a channel for receiving a first sealing element and a protrusion for engaging a vessel liner to minimize radial elongation and movement of the vessel liner.

3. The boss according to claim 2, further comprising a first sealing element disposed in the channel of the first component.

4. The boss according to claim 1, wherein the second component includes at least one channel for receiving a second sealing element.

5. The boss according to claim 1, further comprising a second sealing element disposed between the first component and the second component.

6. The boss according to claim 1, wherein each of the first coupling element and the second coupling element includes a helical thread for coupling the first component to the second component.

7. The boss according to claim 1, wherein the first component and the second component cooperate to form a passage, the passage providing fluid communication between a pressure chamber formed in the vessel and an environment outside the vessel.

8. The boss according to claim 1, wherein the second component is adapted to receive a utility device.

9. A pressure vessel for storing a fluid, the pressure vessel comprising:

a first component adapted to be formed in an opening of the vessel, the first component having a shoulder portion and a neck portion, wherein the neck portion includes a first coupling element;

a second component having a shoulder portion and a neck portion, the neck portion including a second coupling element, wherein the second coupling element engages the first coupling element to secure the second component with the first component; and a liner disposed around the neck portion of the first component, wherein a portion of the liner is disposed between a part of the neck portion of the first component and a part of the neck portion of the second component and between a part of the shoulder portion of the first component and a part of the shoulder portion of the second component.

10. The vessel according to claim 9, wherein the first component includes at least one of a channel for receiving a first sealing element and a protrusion for engaging a vessel liner to minimize radial elongation and movement of the vessel liner.

11. The vessel according to claim 10, further comprising a first sealing element disposed in the channel of the first component.

12. The vessel according to claim 9, wherein the second component includes at least one channel for receiving a second sealing element.

13. The vessel according to claim 9, further comprising a second sealing element disposed between the first component and the second component.

14. The vessel according to claim 9, wherein each of the first coupling element and the second coupling element includes a helical thread for coupling the first component to the second component.

15. The vessel according to claim 9, wherein the first component and the second component cooperate to form a passage, the passage providing fluid communication between a pressure chamber formed in the vessel and an environment outside the vessel.

16. The vessel according to claim 9, wherein the second component is adapted to receive a utility device.

17. A method for molding an inner liner of a pressure vessel including a boss, the method comprising the steps of:

providing a first component of the boss adapted to be formed in an opening of the vessel, the first component having a shoulder portion and a neck portion, wherein the neck portion includes a first coupling element;

securing a parison around the neck portion of the first component;

molding the parison into a pre-determined formation, thereby forming a hollowed liner of the vessel;

coupling a second component of the boss to the first component, wherein the second component includes a neck portion and a shoulder portion, the neck portion including a second coupling element for engaging the first coupling element to secure the second component to the first component;

wherein the liner is disposed around the neck portion of the first component, and a portion of the liner is disposed between a part of the neck portion of the first component and a part of the neck portion of the second component and between a part of the shoulder portion of the first component and a part of the shoulder portion of the second component.

18. The method according to claim 17, wherein the first component includes at least one of a channel for receiving a first sealing element and a protrusion for engaging a vessel liner to minimize radial elongation and movement of the vessel liner.

19. The method according to claim 17, wherein the second component includes at least one channel for receiving a second sealing element.

20. The method according to claim 17, further comprising the step of providing a sealing element disposed between the first component and the second component.

* * * * *